United States Patent

[11] 3,623,577

[72] Inventor Ronald S. Scharlack
 San Antonio, Tex.
[21] Appl. No. 876,547
[22] Filed Nov. 13, 1969
[45] Patented Nov. 30, 1971
[73] Assignee Kelsey-Hayes Company

[54] CORRUGATED ROTOR FOR DISK BRAKES
 6 Claims, 5 Drawing Figs.

[52] U.S. Cl. ................................................ 188/71.6,
 188/218 XL, 188/264 AA, 192/70.14, 192/107 R,
 192/113 A
[51] Int. Cl. ....................................................... F16d 65/84
[50] Field of Search............................................ 188/71.6,
 73.2, 264 A, 264 AA, 218 XL; 192/113 A, 107 R,
 107 C, 70.14

[56] References Cited
 UNITED STATES PATENTS

| | | | |
|---|---|---|---|
| 2,642,959 | 6/1953 | Freer...................... | 188/264 A |
| 3,063,531 | 11/1962 | Aschauer................. | 192/107 X |
| 3,295,640 | 1/1967 | Beuchle.................. | 188/264 AA |

FOREIGN PATENTS

| | | | |
|---|---|---|---|
| 1,156,941 | 12/1957 | France ..................... | 192/107 R |
| 1,492,329 | 7/1967 | France ..................... | 188/218 XL |

Primary Examiner—George E. A. Halvosa
Attorney—Harness, Dickey & Pierce

ABSTRACT: A disk brake assembly having two embodiments of rotors each of which provides a plurality of separate braking surfaces with airgaps disposed between the braking surfaces. The braking surfaces and airgaps are disposed at an angle to the edge of the brake pad so that the brake pad edge is always in contact with at least two of the braking surfaces.

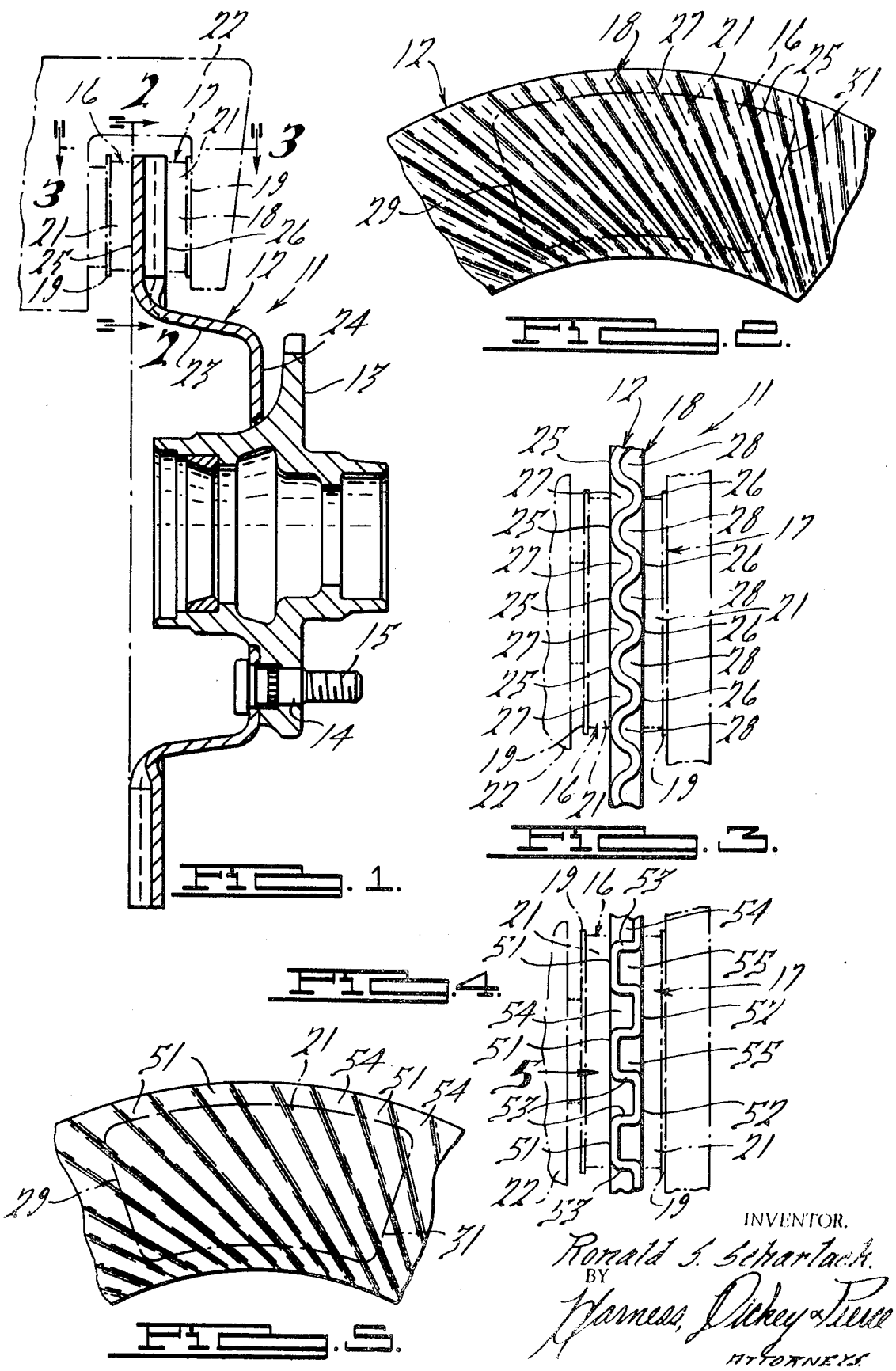

CORRUGATED ROTOR FOR DISK BRAKES

BACKGROUND OF THE INVENTION

This invention relates to a disk brake assembly and more particularly to an improved rotor having a corrugated shape for such a disk brake assembly.

The several inherent advantages of disk brake assemblies has lead to a high degree of commercial acceptance of this type of brake in motor vehicles. When disk brakes are employed with either heavy or high performance vehicles, it has been proposed to provide what is known as a ventilated rotor for assisting in the cooling of the rotor or disk. With such an arrangement, the rotor is provided with airgaps that extend in a generally radial direction between the annular braking surfaces of the disk. Upon rotation of the rotor, a cooling airflow passes through these airgaps to cool the braking surfaces. Although this type of arrangement is satisfactory, the provision of the airgaps adds to the cost of the rotor. In addition, if the disk is formed as a casting, the cost of forming the airgaps is magnified.

It is, therefore, a principal object of this invention to provide an improved, low-cost rotor for a disk brake.

It is another object of the invention to provide a fabricated rotor for a disk brake assembly having a simplified airgap arrangement.

In a disk brake assembly, the brake pads engage the rotor over a relatively small portion of its total area at a given instant. This results in the generation of considerable thermal differences across the face of the braking surfaces. To improve the cooling of the rotor and to minimize the effects of these thermal differences, it has been proposed to provide slots or airgaps in the braking surface of the rotor. Since the brake linings are compressible to some extent, if these slots or airgaps extend in a direction parallel to the edge of the linings of the brake pads, there is a possibility of damage to the linings when they pass from one of the airgaps to the adjacent braking surface.

It is, therefore, another object of this invention to provide a rotor for a disk brake assembly having discontinuous braking surfaces.

It is a further object of this invention to provide a rotor for a disk brake assembly having discontinuous braking surfaces that will not adversely affect the frictional linings of the brake pads.

SUMMARY OF THE INVENTION

This invention is particularly adapted to be embodied in a disk brake assembly having a brake pad with a frictional lining, means for actuating the brake pad and an associated brake rotor. The rotor is provided with a plurality of spaced airgaps separated by braking surfaces. The airgaps extend across the width of the frictional lining for providing a continuous path for cooling air between the adjacent braking surfaces. The braking surfaces are disposed at an angle to the adjacent edge of the frictional lining whereby the edge of the lining always is in contact with at least two of the braking surfaces when the pad is actuated by the actuating means.

Another feature of the invention is also adapted to be embodied in a rotor for a disk brake assembly. In connection with this feature, the rotor has an annular section having an undulating shape in circumferential cross sections. This undulating shape defines peaks on opposite sides of the rotor, which peaks define oppositely facing braking surfaces adapted to be engaged by respective brake pads. The areas between the peaks on each side of the disk define cooling airgaps.

BRIEF DESCRIPTION OF THE DRAWINGS

FIG. 1 is a cross-sectional view, taken along a vertical plane, of a disk brake assembly embodying this invention.

FIG. 2 is an elevational view, taken along the line 2—2 of FIG. 1, showing one of the braking surfaces of the rotor.

FIG. 3 is a cross-sectional view taken along the line 3—3 of FIG. 2.

FIG. 4 is a view, in part similar to FIG. 3, showing a second embodiment of the invention.

FIG. 5 is an elevational view, taken generally in the direction of the arrow 5 in FIG. 4, showing one of the braking faces of the rotor of this embodiment.

DETAILED DESCRIPTION OF THE PREFERRED EMBODIMENTS

Referring first to the embodiment of FIGS. 1 through 3, an automotive disk brake assembly embodying this invention is identified generally by the reference numeral 11. The brake assembly 11 includes a rotor, indicated generally by the reference numeral 12, that is fixed to a hub 13 by means of a plurality of fasteners 14 (only one of which appears in the drawings). The fasteners 14 have threaded portions 15 for attachment of the hub 13 and rotor 12 to a vehicular wheel (not shown) for rotation therewith.

A pair of friction pad assemblies 16 and 17 are disposed on opposite sides of an annular portion 18 of the rotor 12. Each of the pads 16 and 17 includes a backing plate 19 and a frictional lining 21. A caliper assembly 22 is associated with the friction pads 16 and 17 and includes any known actuating means for operating the pads 16 and 17 into frictional engagement with the rotor 12.

The rotor 12 is preferably formed from sheet steel and may be shaped by stamping, spinning, forging or any known metal forming technique or combination of forming operations. Adjacent the inner periphery of the annular portion 18, the rotor 12 is formed with a generally conical-shaped section 23 that terminates at its inner periphery in a generally radially extending section 24. It is the section 24 that is directly affixed to the hub 13.

The annular section 18 is generally corrugated and in circumferential cross sections (FIG. 3) has a corrugated or sinuous shape. This shape results in the formation of peaks 25 on the side adjacent the brake pad 16 and alternately disposed peaks 26 disposed on the side adjacent the brake pad 17. Airgaps 27 are formed between the peaks 25 and airgaps 28 are formed between the peaks 26. From an inspection of FIG. 2, it will be noted that the airgaps 27 and 28 on each side of the rotor 12 extend across the width of the frictional lining 21 and thus these airgaps extend from the radial inner extremity of the frictional lining 21 past its radial outer extremity. It will additionally be noted that the peaks 25 and 26 are disposed at an angle to the opposite edges 29 and 31 of the frictional lining 21. Thus, each edge 29 and 31 is in contact with a plurality of the peaks 25 and 26 at a given time.

When the brake pads 16 and 17 are brought into frictional engagement with the opposite sides of the rotor portion 18 by the actuating means of the caliper assembly 22, a tight frictional engagement will result between the linings 21 and the peaks 25 and 26. There is sufficient contact surface area so as to provide an effective braking surface for halting rotation of the rotor 12, hub 13 and associated wheel. The heat generated by the braking action may be readily dissipated by the airgaps 27 and 28. Since the peaks 25 and 26 are disposed at an angular relationship to the lining edges 29 and 31, these edges will never be disposed completely over a single airgap. Said another way, the edges 29 and 31 are always in contact with a braking surface of the rotor so that they will not be damaged. In addition, the nonradial disposition of the airgaps 27 and 28 assists in eliminating vibration.

The embodiment of FIGS. 4 and 5 is generally similar to the previously described embodiment. In this embodiment, however, the annular portion of the rotor has a slightly different configuration. In this embodiment, the rotor is formed with a first series of flattened peaks 51 disposed adjacent the brake pad 16. The peaks 51 are alternately disposed with peaks 52 that are disposed adjacent the brake pad 17. The peaks 51 and 52 are interconnected by generally axially extending webs 53. It should be obvious that airgaps 54 are thus formed between the peaks 51 and airgaps 55 are formed between the peaks 52.

It will be noted from an inspection of FIG. 5 that, as in the previously described embodiment, the peaks 51 and 52 and airgaps 54 and 55 are disposed in a nonradial relationship. Thus, the edges 29 and 31 of the frictional linings 21 are always in engagement with a plurality of the braking surfaces defined by the peaks 51 and 52. The operation and advantages of this embodiment are the same as the previously described embodiment and will not be repeated.

It should be readily apparent that each of the described embodiments results in a relatively simple construction that may be fabricated from sheet steel. In addition to having a relatively high strength, the described rotors provide effective airgaps directly adjacent the braking surfaces of the rotor.

What is claimed is:

1. In a disk brake assembly having a brake pad with a frictional lining, means for actuating said brake pad and an associated rotor, said rotor having an area adapted to be swept by said frictional lining of said brake pad, said brake pad frictional lining extending for substantially less than the circumference of said rotor and having edges extending across the area of the rotor swept thereby, the improvement comprising means on said rotor providing a plurality of spaced airgaps separated by braking surfaces, said airgaps extending across the width of the frictional lining for providing a continuous path for cooling air between the adjacent braking surfaces, said brake surfaces being disposed at an angle to the adjacent edge of said frictional lining the edges of said brake surfaces surrounding each airgap being disposed at such an angle to each other and to said edges of said brake pad frictional lining that said edge of said lining always are in contact with at least two of said braking surfaces when actuated by said actuating means.

2. A disk brake assembly as set forth in claim 1 wherein the rotor is formed with two series of braking surfaces as defined, one on either side of the rotor.

3. A disk brake assembly as set forth in claim 2 wherein the rotor has a generally corrugated shape in circumferential cross sections with the peaks thereof defining the respective braking surfaces.

4. A disk brake assembly as set forth in claim 3 wherein the cross-sectional shape of the rotor in the circumferential sections generally resemble a sine wave.

5. A disk brake assembly as set forth in claim 3 wherein the peaks are formed by generally flattened sections of the rotor and are interconnected by generally axially extending sections.

6. A rotor as set forth in claim 3 wherein the rotor is formed from sheet steel.

* * * * *